April 30, 1946.                M. P. MATUSZAK                2,399,368
                          PRODUCTION OF PARAFFINS
                             Filed Dec. 4, 1942
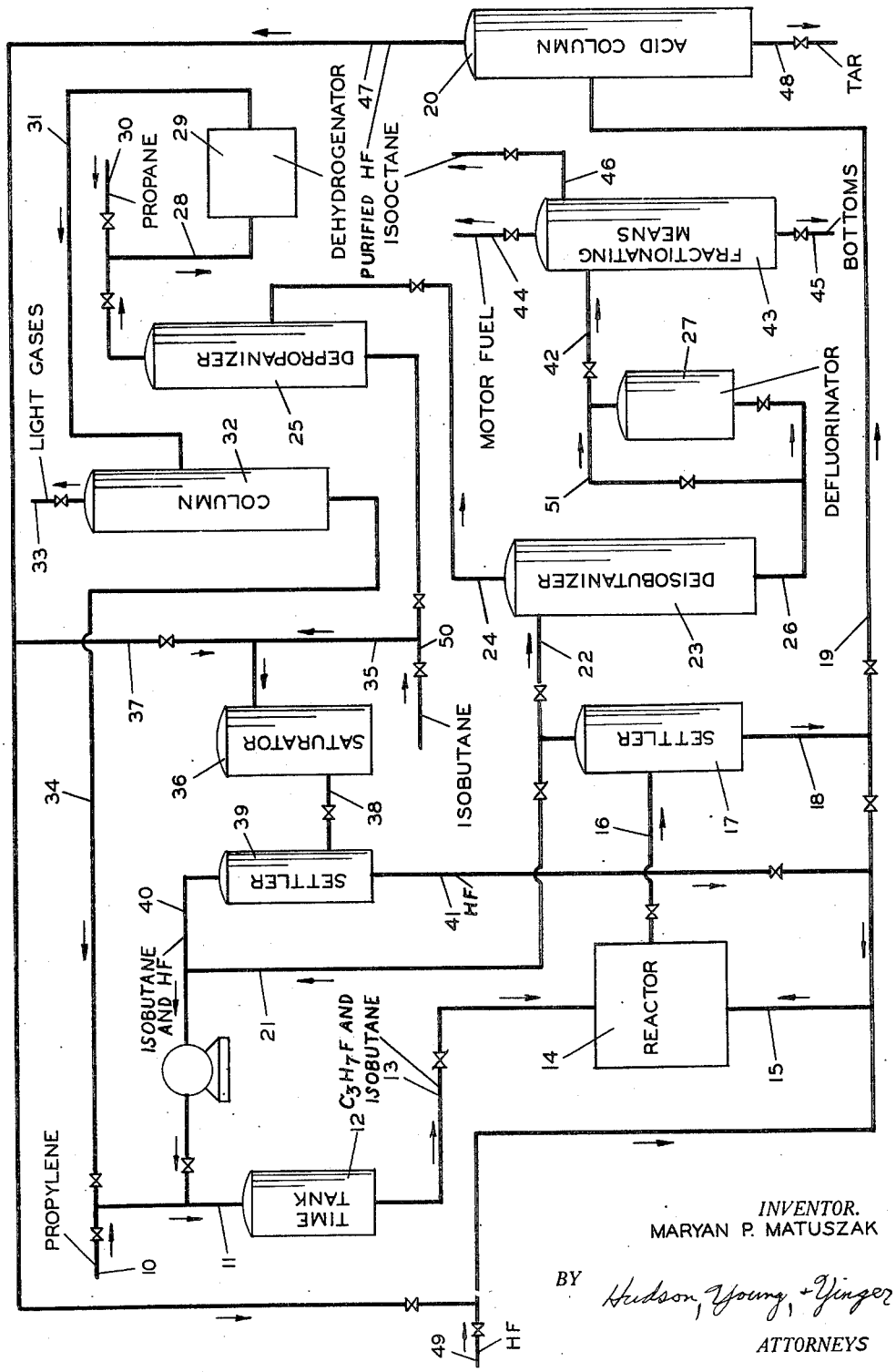
INVENTOR.
MARYAN P. MATUSZAK
BY Hudson, Young, + Yinger
ATTORNEYS Patented Apr. 30, 1946

2,399,368

UNITED STATES PATENT OFFICE 2,399,368

PRODUCTION OF PARAFFINS

Maryan P. Matuszak, Bartlesville, Okla., assignor to Phillips Petroleum Company, a corporation of Delaware Application December 4, 1942, Serial No. 467,872

7 Claims. (Cl. 260—683.4)

This invention relates to a process for reacting paraffins and olefins in the presence of a liquid acid-type catalyst to produce other paraffins. More specifically, in one modification, it relates to the production of especially desirable paraffins different in molecular structure from the products resulting from simple junctures of the original paraffins and olefins. This application is a continuation-in-part of copending application, Serial No. 404,395, filed July 28, 1941.

In present-day acid-catalyzed alkylation processes for reacting paraffins with olefins to produce heavier paraffins, the principal or major constituents of the alkylates produced under ordinary good reaction conditions are those which would be formed if one olefin molecule added to one paraffin molecule by a reaction generally termed paraffin-olefin juncture. At least in some cases, apparently a methyl group from the original paraffin becomes attached to one of the two double-bond carbon atoms of the original olefin and the rest of the original paraffin becomes attached to the other double-bond carbon atom of the original olefin. In any event the number of carbon atoms per molecule of the major chemical components of the product is equal to the sum of the numbers of carbon atoms per molecule of the paraffin and olefin reactants. Further, only a limited number of the many paraffin isomers characterized by this number of carbon atoms per molecule are formed as primary products of simple paraffin-olefin junctures, although other isomers may be formed in small proportions by so-called secondary and side reactions, such as isomerization of the primary product, dimerization of the original olefin accompanied or followed by hydrogenation of the dimer, and the like.

Those skilled in the art of alkylation have hitherto directed their efforts mainly towards increasing the extent of the simple paraffin-olefin juncture and towards decreasing the extent of side reactions, especially polymerization of the olefin. However, in many instances, specific side reactions other than polymerization produce constituents in the alkylate that are more desirable than those produced by the juncture of the initial paraffin with the initial olefin. Further, these specific desirable side reactions may be greatly and selectively promoted in accordance with the concept of the present invention.

One object of my invention is to react hydrocarbons to produce other hydrocarbons.

An object of this invention is to produce paraffins by an alkylation process wherein certain desirable side reactions, which ordinarily occur to only a limited extent, are selectively promoted so that they occur to a much larger extent.

Another object of this invention is so to react isobutane and an olefin other than isobutylene and having three to five carbon atoms per molecule as to obtain high yields of 2,2,4-trimethylpentane (isooctane).

A further object of my invention is to produce paraffin hydrocarbons.

Another object of this invention is to produce isooctane, which has eight carbon atoms per molecule, from isobutane and propylene, which have four and three carbon atoms per molecule, respectively.

Another object of this invention is to increase the proportion of 2,2,4-trimethylpentane produced by reacting isobutane and butene-2 in the presence of a liquid acid-type alkylation catalyst.

Another object of this invention is to increase the proportions of 2,2,4-trimethylpentane and 2,3,4-trimethylpentane produced by reacting isobutane and butene-1 in the presence of a liquid acid-type alkylation catalyst.

Another object of this invention is to increase the total yield of higher boiling and normally liquid or gasoline-range paraffins produced from a given weight of an olefinic reactant in acid-catalyzed conversion of isopentane to heavier paraffins.

Another object of this invention is to produce high proportions of isobutane and isohexanes from isopentane and an olefin in the presence of a liquid acid-type alkylation catalyst.

Other objects and advantages of this invention will appear from the accompanying description and discussion.

This invention, in a broad sense, comprises producing from paraffins and olefins in the presence of a liquid acid-type alkylation catalyst desirable saturated hydrocarbons having molecular structures different from those of the products of simple primary junctures of the original paraffins and olefins. In a more limited sense, it comprises selectively producing specific paraffins which are normally not present or at most present in only relatively small proportions in the products from acid-catalyzed alkylations of the original paraffins with the original olefins. In other words, it comprises selectively promoting specific side reactions, other than polymerization of olefins, in acid-catalyzed alkylation of paraffins with olefins.

One particularly noteworthy side reaction selectively promoted in accordance with the present invention results in the over-all effect of a hydrogen-transfer from the reactant paraffin to the olefinic reactant, followed by juncture of the resulting dehydrogenated paraffin or newly formed "olefin" with unreacted paraffin. This reaction produces a by-product paraffin having the same number of carbon atoms per molecule as the olefinic reactant, and a product paraffin having exactly twice as many carbon atoms per molecule as the original paraffin in the feed. This reaction is particularly desirable when isobutane is being reacted with propylene, normal butenes, or amylenes, especially when a plentiful supply of isobutane is available, since the product contains large amounts of 2,2,4-trimethylpentane (isooctane), which is desirable because of its high octane rating.

Isobutane and propylene ordinarily yield 2,3- and 2,4-dimethylpentanes by simple paraffin-olefin juncture, whereas they yield propane and octanes (mostly isooctane) by the "hydrogen transfer-alkylation" herein described. Isooctane has a higher octane rating (A. S. T. M. octane No.=100) than these dimethylpentanes (A. S. T. M. octane No.=82 and 89 respectively), and the theoretical yield of isooctane based on the weight of propylene in the feed is 271 per cent, which is considerably more than the theoretical yield of dimethylpentanes of only 238 per cent. The by-product propane may be advantageously dehydrogenated in a dehydrogenation step to produce propylene and hydrogen, and the resulting propylene may be returned to the hydrogen transfer alkylation step.

Although the detailed mechanisms of all the reactions are not yet fully known, the following illustrative chemical equations (2 to 5, inclusive), deduced from data obtained by extensive experimentation, appear to account for some of the principal reactions of isobutane and propylene that can occur under the conditions herein disclosed, as contrasted with the conventional reaction (Equation 1).

*Simple paraffin-olefin juncture*

(1) 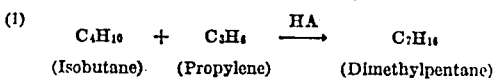
(Isobutane)   (Propylene)         (Dimethylpentane)

*Hydrogen transfer-alkylation*

(2) 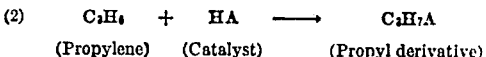
(Propylene)   (Catalyst)   (Propyl derivative)

(3) 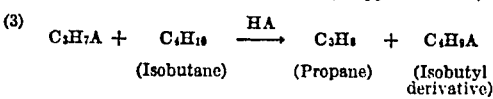
(Isobutane)   (Propane)   (Isobutyl derivative)

(4) 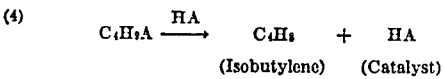
(Isobutylene)   (Catalyst)

(5) 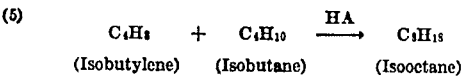
(Isobutylene)   (Isobutane)   (Isooctane)

Isobutane and normal butenes yield 2,3,4-trimethylpentane and 2,4-dimethylhexane by simple paraffin-olefin juncture, whereas they yield isooctane by the process of this invention. Of these products, isooctane (2,2,4-trimethylpentane) has the highest octane number and is therefore the most desirable for use in such motor fuels as aviation gasoline. Although the hydrogen transfer-alkylation is more desirable, in reacting isobutane and normal butenes, than simple or primary paraffin-olefin junctures, another over-all reaction, which may be called "olefin isomerization-alkylation" and which normally occurs to only a relatively minor extent, is even more desirable since it avoids the formation of by-product normal butane. This reaction is selectively encouraged in some ways by conditions similar to those which encourage hydrogen transfer-alkylation; it will be discussed hereinafter.

The simple junctures of isobutane with amylenes yield nonanes, which have not yet been positively identified as to particular isomers. The reaction of this invention yields isooctane (2,2,4-trimethylpentane) as a product and pentanes as a by-product. This reaction occurs to an appreciable but minor extent under ordinary alkylating conditions, but by application of the principles of this invention it may be selectively greatly encouraged. The isooctane thus produced as a major product has a higher A. S. T. M. octane number (100) than that of a nonane fraction normally produced (e. g., 91.6). Although the theoretical yield of octanes based on the weight of olefin in the feed by this hydrogen transfer-alkylation is slightly less than the theoretical yield of nonanes by ordinary alkylation, the by-product pentanes are also useful for blending in gasoline and should be included in a consideration of the relative yields. Accordingly, the total theoretical yield of gasoline products (octanes plus pentanes) is 266 weight per cent for the hydrogen transfer-alkylation, or considerably more than that of 183 for the ordinary or simple-juncture alkylation.

Other examples of hydrogen transfer-alkylations are: isobutane and cycloolefins to give octanes and by-product cycloparaffins; isobutane and ethylene to give octanes and ethane; and the like. The reaction of isobutane and cycloolefins, such as cyclohexene, proceeds readily under about the same conditions as the reaction of isobutane and normal butenes. When ethylene is used, it is desirable to use a relatively high reaction temperature such as about 200° to 400° F., or a very active catalyst to obtain reasonably rapid reaction rates. One of the most satisfactory catalysts for use with ethylene consists of a mixture of substantially anhydrous hydrofluoric acid having a minor proportion, such as 1 to 10 per cent by weight, of boron fluoride; the small proportion of boron fluoride has a strong promoting or enhancing effect on the catalytic action of the hydrofluoric acid.

In the alkylation of isobutane with butylenes, in accordance with one modification of my invention, the over-all reaction already mentioned which may be termed "olefin isomerization-alkylation" tends to minimize differences in products obtained from different butylenes. That is, there is a tendency for any given butylene to isomerize, under alkylating conditions, to an equilibrium mixture of the various butylenes. If an equilibrium mixture (thermodynamic equilibrium) were actually obtained before any of the butylenes entered into the alkylation reaction, identical products would be obtained from each of the different butylenes. By the application of the present invention, the isomerization of normal butylenes prior to juncture with isobutane can be encouraged to the extent that butene-1 gives a product which is similar to that hitherto normally obtained from butene-2, and butene-2 gives a product which approaches that hitherto ordinarily obtained only from isobutylene.

Another desirable side reaction, which may be selectively encouraged in accordance with the principles of this invention, occurs normally only to a minor extent in the alkylation of isopentane with olefins. This side reaction results in an apparent disproportionation of isopentane to isobutane and isohexanes (2- and 3-methylpentanes). For example, under some conditions, which are especially effective in the alkylation of isopentane with olefins in the presence of anhydrous hydrofluoric acid, a surprisingly large proportion of the isopentane is converted to isobutane and isohexanes, concurrently with primary alkylation of another part of it, so that yields of hexanes and higher-boiling gasoline hydrocarbons as high as 500 or more per cent by weight of the olefin in the feed are obtained. This "disproportionation-alkylation" may be advantageously carried out in a combination alkylation-fractionation equipment wherefrom isobutane is distilled overhead, in company with some hydrofluoric acid, while the reactions are progressing. The isobutane produced by the disproportionation may be used as feed stock for other processes, as for a process in which it itself is alkylated; in the interest of an increased yield of higher-boiling or gasoline hydrocarbons from the disproportionation-alkylation, the isobutane is preferably removed from the reaction mixture as soon as possible after formation, and it is preferably not recycled with unreacted isopentane to this particular process.

In addition to being based in part on the observation that in many alkylations using a liquid acid-type catalyst, especially hydrofluoric acid, certain side reactions lead to products which in specific instances are more desirable than the primary or simple paraffin-olefin juncture products, the present invention in some of its features involves the following general principles:

1. Different reactions have different temperature coefficients of reaction rates, so that certain reactions may be selectively encouraged by selecting and controlling the temperature and the reaction time.

2. Over-all or mass reaction rates are dependent upon concentrations of reactants, so that certain reactions may be selectively encouraged by suitably controlling concentrations of reactants.

With respect to the first of these principles, in the concept of this invention, an increase in reaction temperature favors hydrogen transfer-alkylation and disproportionation-alkylation, and disfavors olefin isomerization-alkylation, relative to simple or primary alkylation. That is, increasing the temperature increases the reaction rates of hydrogen transfer and of disproportionation relatively more than the reaction rate of primary alkylation, and it increases the reaction rate of olefin isomerization relatively less than the reaction rate of primary alkylation. The practical temperature range is of course limited by excessive cracking reactions or decompositions at the upper limit and by disadvantageously low reaction rates at the lower limit. Within the practical temperature range, the optimum temperature for favoring the desired side reaction may be readily determined by trial for any particular case. For promoting hydrogen transfer-alkylation and disproportionation-alkylation, a temperature in the upper part of the practical range is to be preferred; for promoting olefin-isomerization-alkylation, a temperature in the lower part of the practical range is to be preferred. The practical temperature range varies somewhat with specific catalyst and reactants, but for the sake of concreteness it may be said to be roughly from about —20° F. to about 300° F. for such a catalyst as hydrogen fluoride and for olefins other than ethylene. The reaction temperature is interrelated with the reaction time, for the reaction time required to effect a given extent of reaction is generally shorter at a high temperature than at a low temperature.

With respect to the second of these principles, in general, the desired side reactions are preferentially favored if the concentration of free olefin is minimized by reaction with the catalyst before the olefin can react with the paraffin by primary alkylation or with additional olefin by polymerization. Although olefins readily add to hydrogen fluoride or undergo hydrofluorination, to form alkyl fluorides, the part played by this reaction in primary paraffin-olefin and olefin-olefin junctures in the presence of concentrated hydrofluoric acid as a catalyst is that of a reversible side reaction, not that of an intermediate reaction; that is, these primary juncture reactions comprise the addition of an activated paraffin molecule or of an activated olefin molecule directly to a simple olefin molecule, and alkyl fluorides or similar olefin derivatives undergo these reactions only after being converted to simple olefins. Hence, the rates of primary paraffin-olefin and olefin-olefin junctures are decreased by lowering of the concentration of free or uncombined olefin in the reaction zone. Conversely, the rates of the competitive side reactions, in which the olefin appears to take part relatively more effectively in the form of a compound or complex with the catalyst, as illustrated by Equations 2 to 5, are simultaneously increased. Specific examples of such side reactions are those involving hydrogen transfers, olefin isomerization, and the like.

Although one excellent method of obtaining maximum concentrations of combined olefin with minimum concentrations of free olefin evidently involves the direct use of alkyl compounds, such as alkyl fluorides, alcohols, and the like, instead of olefins, as alkylating agents, in practice this method makes necessary the use of a separate step for producing alkyl compounds from olefins. A simple method not requiring such an extra step is advantageous in commercial applications. In accordance with one aspect of the present invention, results approaching the ideal are obtained by adding the olefin to a paraffinic stream containing only a small proportion of a suspended and/or dissolved liquid acid-type alkylation catalyst, to the total catalyst being roughly equivalent stoichiometrically to the total added olefin and giving the added olefin an opportunity to become combined with the limited quantity of catalyst, prior to introducing the stream into an alkylating zone, in which an excess of the same catalyst is present. Such a procedure differs from previous practice, in which it has been thought desirable to avoid contacting the olefin with the alkylating catalyst prior to introduction into the alkylating zone, in order to minimize undesired olefin consumption by polymerization and hydropolymerization, which occur extensively when a large separate catalyst phase is present. In accordance with the concept of this invention, however, in order to selectively promote desirable side reactions such as have been described hereinbefore, it is advantageous to contact the olefin with roughly an equivalent proportion of a hydrofluoric acid catalyst diluted by a large excess of paraffin hydrocarbons prior to introduction into the alkylating zone, since thereby the formation of catalyst-olefin addition products or complexes is favored without appreciable undesirable consumption of olefin by polymerization, hydropolymerization, conjunct polymerization, and the like. Once formed, these addition products apparently do not react extensively with alkylatable paraffins to produce the ordinary paraffin-olefin juncture products until they are reconverted to olefins, either the same as the original olefins or different from them, thereby causing a delay in the effecting of paraffin-olefin junctures and consequently presenting opportunities for such desirable side reactions as hydrogen transfers, olefin isomerizations, and disproportionations to occur.

As the catalyst, liquid substantially anhydrous hydrofluoric acid is preferred because it is advantageously appreciably soluble in paraffin hydrocarbons and withal it is readily removable and/or recoverable from them. The solubility of hydrofluoric acid in paraffins is illustrated by the solubility of hydrofluoric acid in isobutane, which has been experimentally determined to increase with temperature substantially linearly from 0.3 to 0.9 per cent by weight in the temperature range of 32° to 140° F. A concentration of uniformly dispersed hydrofluoric acid of between about 0.6 and 4 per cent by weight is preferred. However, the invention is generally applicable with minor modifications to other liquid acid-type condensation catalysts, such as sulfuric acid, mixtures of sulfuric acid and hydrofluoric acid, chlorosulfonic acid, fluorosulfonic acid, phosphoric acid, phosphoric acid-boron fluoride mixtures, aluminum chloride suspended or dissolved in various solvents, hydrofluoric acid containing small proportions of dissolved substances such as boron fluoride, and the like. Hydrofluoric acid is usually preferred in many alkylations because it results in a more clean-cut reaction and the ranges of operating conditions used with it are generally broader and more readily controllable than with other catalysts. Since higher-than-usual temperatures are generally desirable in the practice of my invention, catalysts which act as oxidizing agents at such temperatures are often not suitable for use in the commerical practice of my invention. When ethylene and/or normal paraffins are reactants and hydrofluoric acid the catalyst, however, it is desirable to add a small proportion, such as 1 to 10 per cent by weight, of boron fluoride to the hydrofluoric acid to increase the activity of the catalyst.

An understanding of some aspects of this invention may be aided by reference to the drawing, which is a flow-diagram of one preferred arrangement of apparatus suitable for practicing the invention. This diagram obviously can not show all possible variations and minor modifications of the invention and should not be used to limit the invention unduly. For the sake of concrete illustration but without limiting the invention, the reactants will be assumed to be isobutane and propylene, and the alkylating catalyst will be liquid anhydrous hydrofluoric acid.

Propylene, which is a specific example of an olefin other than isobutylene having three to five carbon atoms per molecule, is admitted through inlet 10 into a stream of hydrocarbons flowing in conduit 11 and containing chiefly isobutane and a small proportion of dissolved and/or substantially uniformly dispersed or entrained substantially anhydrous hydrofluoric acid. The relative proportions of the two combining streams should preferably be such that the propylene is approximately molecularly equivalent to the hydrofluoric acid. Although the optimum proportions have not been determined for all conditions, a mol ratio of hydrofluoric acid to olefin of about 1.0:1 to 1.2:1 gives generally results close to the optimum, and mol ratios between about 0.75 and 3.0 generally give satisfactory results provided that no large local excess of hydrofluoric acid exists as a separate liquid phase. The exact optimum mol ratio for any given instance depends upon several factors, such as degree of dilution by paraffins, temperature, time, agitation or mixing efficiency, and individual characteristics of the particular olefin used, but it can be readily determined for any particular case by trial.

The combined stream from conduit 11 flows into time tank 12, wherein the stream resides only sufficiently long for the major part of the olefin to react with hydrogen fluoride to form the corresponding alkyl fluoride, such as isopropyl fluoride, which is formed when the olefin is propylene. Means of agitation sufficient to insure thorough mixing of the reactants may be provided, but usually adequate mixing may be obtained in conduit 11 by using turbulent flow conditions or a sufficiently long conduit, although time tank 12, when it is more than a simple extension of conduit 11, may be baffled, or packed, as with an inert granular material, or provided with transverse perforated plates to aid commingling of the reactants. The residence time in time tank 12 may vary within a wide range, for example from about 1 minute to an hour or more, depending upon temperature, concentrations of olefin and hydrogen fluoride, and specific properties of the particular olefin used. These variables are easily correlatable by a few trial runs for any particular system by one skilled in the art. When the olefin is propylene, a temperature of about 100° F., olefin and hydrogen fluoride concentrations in the range of about 2 to 10 mol per cent of the total combined stream, anhydrous hydrogen fluoride and a time in the range of 5 to 15 minutes give good results; when the olefin is one or more of the butylenes and amylenes, the time may be appreciably shorter. It is not necessary that the hydrofluorination of the olefin proceed to completion, or to the thermodynamic equilibrium, but only that a substantial part of the olefin become combined with the hydrofluoric acid, so that the concentration of free olefin, which in the presence of liquid hydrofluoric acid results in paraffin-olefin and olefin-olefin junctures, is minimized.

From time tank 12, the mixture flows through conduit 13 to reactor 14. Reactor 14 may be any suitable vessel resistant to corrosion by hydrofluoric acid and provided with a mixing device, such as one or more jet-type and/or perforated plate-type inlets, baffles, or stirrers, capable of maintaining the hydrocarbon and the hydrofluoric acid in a state of intimate mixture. Liquid concentrated or substantially anhydrous hydrofluoric acid is introduced to reactor 14 through conduit 15. The relative proportions of hydrofluoric acid and hydrocarbon and the conditions of temperature and pressure in reactor 14 should be such that two distinct liquid phases are present. Usually a volume ratio of hydrofluoric acid to hydrocarbon in the range of 0.3:1 to 2:1 is preferred and the optimum ratio appears to be 1:1, however, volume ratios outside this range may be used, although if they are much higher or lower, good contacting of acid with hydrocarbon becomes relatively difficult to maintain. The temperature may be in the range of about 0 to 200° F., a temperature above about 100° F. is preferred and is readily obtained because the overall heat effect from the reactions is exothermic. The pressure need be sufficient only to maintain the reaction mixture in a liquid or dense-phase condition.

After a suitable average residence time in reactor 14, for example a time in the range of 1 to 30 minutes, the reaction mixture passes through conduit 16 to settler 17, where it is separated as by gravitational and/or centrifugal means, into two liquid phases. Most of the denser or hydrofluoric acid phase is recycled through conduits 18 and 15 to reactor 14; a small proportion is usually passed through conduit 19 to acid-rerun column 20 for purification before re-use. A part of the lighter or hydrocarbon phase may be recycled through conduit 21 to conduit 11, wherein it dilutes the incoming olefin and carries dissolved or entrained hydrofluoric acid to react with the olefin. The remainder, or all, of this phase is passed through conduit 22 to deisobutanizer 23, wherein it is separated into two fractions, a low-boiling fraction comprising isobutane and propane and minor amounts of hydrofluoric acid, and a high-boiling fraction comprising higher-boiling product paraffins, mostly gasoline-range paraffins. The low-boiling fraction is passed through conduit 24 to depropanizer 25, and the high-boiling fraction is passed through conduit 26 to defluorinator 27, or directly to fractionating means 43 through conduit 51.

Depropanizer 25, which also includes means for removing hydrofluoric acid, separates propane from isobutane. The propane is passed through conduit 28 to dehydrogenator 29, wherein it is cracked noncatalytically or, preferably, dehydrogenated catalytically to produce propylene. Additional propane may be introduced to dehydrogenator 29 through inlet 30.

Propylene-containing effluent from dehydrogenator 29 is passed through conduit 31 to column 32, wherein hydrogen, methane, and other materials boiling lower than propylene are separated and are removed therefrom through conduit 33. The propylene may be concentrated by being fractionally distilled and then may be used as olefinic feed to the hydrofluorination and alkylation steps, but it is preferably passed together with the propane directly through conduit 34 to conduit 11 as the olefinic feed. The propane acts as a desirable inert material in the reaction zone. Although, in ordinary alkylations, inerts are usually considered undesirable because of adverse effects upon equipment capacities, the presence of inert materials is somewhat advantageous in the present process by selectively promoting desirable reactions such as hydrogen-transfer reactions. Apparently the advantage results from a decrease in the rate of primary paraffin-olefin junctures, owing to a lowering of the isoparaffin concentration in the reaction zone, thus increasing the proportion of olefin undergoing hydrogen transfer prior to addition to the isoparaffin. Similarly, the presence of inerts promotes isomerizations of 1-olefins to 2-olefins and of secondary olefins apparently to isoolefins prior to alkylation in systems in which normal butylenes and/or amylenes are used to react with isobutane.

Isobutane from the bottom of depropanizer 25 is passed through conduit 35 to saturator 36 wherein it is agitated and becomes saturated with hydrofluoric acid admitted through conduit 37. Additional isobutane is introduced through inlet 50, to replace that consumed in the process.

The isobutane-hydrofluoric acid mixture from saturator 36 passes through conduit 38 to settler 39 wherein it is separated, as by gravitational and/or centrifugal means, into two liquid phases. The separation is preferably incomplete to the extent that the upper phase contains not only dissolved hydrofluoric acid but also a minor proportion of substantially uniformly dispersed or entrained hydrofluoric acid, so that the total hydrofluoric acid associated with said upper phase, as it is removed from settler 39 through conduit 40, amounts to about 2 to 6 per cent by weight of the upper phase. This upper phase, comprising isobutane and a minor proportion of hydrofluoric acid, is passed through conduit 40 to conduit 11, wherein it serves to dilute the propylene and to supply most of the hydrofluoric acid for reaction with it. The lower, or hydrofluoric acid phase, is recycled through conduit 41 to reactor 14.

In defluorinator 27 the deisobutanized material from deisobutanizer 23, is passed over a contact material having some degree of catalytic dehydrogenation power, such as a supported nickel catalyst, or, more economically, a granular aluminous material such as bauxite or fuller's earth, at a temperature in the range of about 200 to 500° F., to remove organically combined fluorine. The fluorine-free product material passes through conduit 42 to fractionating means 43.

Fractionating means 43 may consist of one or more columns suitably designed for separating the total product material into desired fractions, such as a major gasoline-range fraction, which may be withdrawn through outlet 44, and a minor high-boiling fraction, which may be withdrawn through outlet 45. Substantially pure isooctane may be advantageously separated as a major fraction and may be withdrawn through outlet 46, instead of being left in the gasoline-range fraction.

Acid column 20 separates used hydrofluoric acid into a major overhead fraction of substantially pure or anhydrous hydrofluoric acid and a bottom fraction of tar, water, and other impurities which gradually accumulate in the acid during use. The overhead fraction is recycled through conduit 47 to reactor 14 and/or to saturator 36. The impurities are withdrawn through outlet 48. Make-up acid enters the system at some point such as inlet 49.

It will be understood that the flow-diagram is schematic and that auxiliary equipment, not shown or described, such as pumps, valves, controllers, and the like, may be desirable or even necessary at various points in the process. As such auxiliary equipment are well-known, they can be readily supplied by those skilled in the art.

As has already been indicated, other olefins, such as the butylenes and the amylenes, may be used instead of propylene. However, in practical applications of this invention to the conversion of low-boiling isoparaffins, some choice as to particular olefins is sometimes desirable. For example in the alkylation of isobutane with isobutylene, the preliminary hydrofluorination step of this invention is of no such noteworthy advantage as it is in the alkylation of isopentane with isobutylene. The reason for this differentiation is that the delay in paraffin-olefin juncture effected by the preliminary hydrofluorination of isobutylene leads to no discernible advantage when the original isoparaffin is isobutane, since the nature of the product is not improved, whereas this hydrofluorination leads to increased disproportionation to isobutane and isohexanes when the isoparaffin is isopentane. The invention is of most practical benefit in the alkylation of isobutane with secondary or normal olefins having three to five carbon atoms per molecule, as both the hydrogen-transfer and the olefin-isomerization reactions favored by it lead to the production of product paraffins of advantageously relatively high octane rating. In the alkylation of isopentane, an advantage of the invention is most marked when the olefin is butene-1, for upon isomerization of this olefin and upon subsequent juncture of isopentane with the resulting butylene isomer, product paraffins of higher octane rating are obtained than when the olefin in the paraffin-olefin juncture is the original butene-1. Insofar as disproportionation of isopentane to isobutane and isohexanes is concerned, it may be noted that the presence of the added olefin in some form or other is advantageous, since it has been found experimentally that the disproportionation proceeds relatively very slowly, if at all, when no olefin or olefin derivative is present.

The following examples are illustrative of some of the many aspects of the invention without being necessarily limitative.

EXAMPLE I

Two test runs were made, in a steel batch-type stirrer-equipped reactor, for reacting isobutane and propylene in the presence of anhydrous hydrofluoric acid at about 110° F. The first run was made under what may be termed ordinary alkylating conditions; that is, the propylene was added as a vapor directly to a well-agitated two-liquid-phase mixture of approximately one volume of hydrofluoric acid and three volumes of isobutane, or an approximately ninefold molecular excess of isobutane. The second run was made similarly but under what may be termed selected conditions; that is, the propylene was added as a vapor at one-sixth of the rate used in the first run, the addition being made at a high and relatively quiescent point in the reactor at which the wall was only wetted by the mixture of isobutane and hydrofluoric acid, so that a considerable part of the propylene formed isopropyl fluoride before becoming mixed with the main body of the well-agitated two-liquid-phase mixture of isobutane and hydrofluoric acid. The conditions in this second run were thus relatively favorable to the occurrence of hydrogen transfer from isobutane to propylene prior to rapid alkylation, since the propylene came into contact for a relatively long time with only a limited amount of hydrofluoric acid, which was sufficient to form isopropyl fluoride but was relatively insufficient to act as a catalyst promoting ordinary alkylation and/or polymerization. The reactions were stopped by stopping the stirring and by letting the reaction mixture separate into two liquid layers when the propylene had been in the reactor for 11.5 to 16.0 minutes in the first run and 7.0 to 25.0 minutes in the second run; thus the calculated average reaction time was about the same in both runs, being 13.8 minutes in the first and 16.0 minutes in the second. The yields of liquid paraffins were about the same in both runs, but the quantitative proportions of the individual paraffins differed greatly, as is shown by the following data:

*Composition of product, volume per cent*

| Paraffin | Ordinary conditions | Selected conditions |
|---|---|---|
| Pentanes | 1.7 | 0.0 |
| Hexanes | 5.3 | 3.3 |
| Heptanes | 62.0 | 40.6 |
| Octanes (mainly isooctane) | 19.5 | 41.8 |
| Nonanes+decanes | 8.1 | 6.1 |
| Heavier | 3.4 | 8.2 |
| | 100.0 | 100.0 |

The product from the run made under selected conditions had more than twice as much isooctane (2,2,4-trimethylpentane) as that from the run made under ordinary conditions, and in consequence it had a considerably higher antiknock rating. The fact that it had a relatively somewhat higher content of high-molecular-weight compounds should not be construed as a disadvantage, for the run was made under conditions that were exploratory and far from optimum, so that an undesirable amount of polymerization actually occurred because of the presence of some excess liquid hydrofluoric acid during the hydrofluorination of the propylene; under more closely controlled conditions, as when the propylene is added to isobutane containing substantially only a minor proportion of entrained and/or dissolved hydrofluoric acid, such polymerization is virtually eliminated.

EXAMPLE II

In a batch-type run made at 97 to 105° F. in an 18-liter steel reactor provided with a 540-R. P. M. stirrer, liquid isobutane was thoroughly mixed with about a third of its volume of liquid anhydrous hydrofluoric acid, and 0.10 of its molecular equivalent of isopropyl fluoride, which had been made by reacting propylene and anhydrous hydrofluoric acid, was added at a uniform rate during 13 minutes. The reaction mixture was stirred for an additional 7 minutes, so that the reaction time was 7 to 20 minutes, or an average of 13.5 minutes. The reaction mixture was then separated into two liquid phases, and the upper or hydrocarbon phase was freed from acid and was fractionally distilled to recover the liquid product. This product amounted to 226.4 per cent by weight of the propylene equivalent of the isopropyl fluoride. Its composition in per cent by volume was: hexanes, 3.7; heptanes, 36.6; octanes (mostly isooctane), 55.2; heavier paraffins, 4.5. The aviation-gasoline fraction, cut at 376° F., amounted to 99.7 per cent by volume and had an octane number of 93.4.

EXAMPLE III

In a continuous process similar to that shown in the drawing, propylene is added to a liquid stream of isobutane containing about 2 to 4 per cent by weight of dissolved and entrained (finely subdivided) hydrofluoric acid, in a proportion approximately molecularly equivalent to the hydrofluoric acid. The stream, which is at about 110° F. and is sufficiently well agitated to prevent settling into two liquid layers, passes through a time tank, in which a major part of the propylene forms isopropyl fluoride during a residence time of about 10 to 15 minutes, and then into a reactor in which it is thoroughly mixed with about a third to a half of its own volume of substantially anhydrous liquid hydrofluoric acid.

After a residence of about 10 to 15 minutes in this reactor, the mixture of hydrocarbons and hydrofluoric acid passes to a settler for separation into two liquid layers. The lower or hydrofluoric acid layer is partly recycled to the reactor and partly passed to a fractionation system for purification by distillation before re-use. The upper or hydrocarbon layer is fractionated and treated substantially as already described, in such a way that propane is withdrawn from the process; that unreacted isobutane is recycled together with concomitantly distilled hydrofluoric acid and with acid from the acid-purification system, to the propylene-addition step; that a small proportion, usually only a fraction of 1 per cent, of hydrocarbons boiling above the gasoline range is removed; and that a liquid gasoline range product is obtained in high yield. Of this gasoline-range product, about 50 to 60 per cent by volume boils in the octane range; over 30 per cent by volume, usually 35 to 40 per cent by volume is isooctane (2,2,4-trimethylpentane) and can be readily separated during the fractionation as a separate product of the process. Because of its high content of isooctane, the total gasoline-range product has an A. S. T. M. octane rating of about 92 to 94.

EXAMPLE IV

When butene-1 is used instead of propylene in the process of Example III, the gasoline-range product has an A. S. T. M. octane rating about two to three units higher than that of the gasoline-range product obtained by the ordinary alkylation process from the same quantities of materials under substantially the same conditions except that the preliminary hydrofluorination of the olefin is omitted. Thus, instead of an octane number of about 89 characteristic of the product obtained by ordinary alkylation of isobutane with butene-1 at a temperature of about 115° F. and a contact or reactor-residence time of about 10 minutes, an octane number of about 92 is obtained. This improvement in octane rating illustrates the advantage obtained by the present invention, presumably through hydrogen transfer and/or olefin isomerization.

EXAMPLES V TO X

Data for several batch-type runs for the conversion of isopentane in the presence of hydrofluoric acid, using various olefins, are presented together, for the sake of brevity and conciseness, in the following tabulation.

In the run with propylene, Example V, the amount of isobutane formed was not determined, but it was probably approximately molecularly equivalent to the hexanes (isohexanes), which constituted over 30 per cent of the liquid product. This run was made at an insufficiently high temperature for optimum results, but it is clear that a high extent of disproportionation occurred in spite of this fact.

Among other things, it may be noted from these data that the yield of depentanized liquid product was much higher than that to be expected from ordinary alkylation, being as high as over twice the theoretical alkylation yield computed on the basis of one molecule of olefin reacting with one molecule of isopentane. Yields even higher than those shown are obtained at relatively higher temperatures, such as temperatures in the preferred range of 100 to 200° F. With respect to the two runs made with isobutylene, the yield was highest in the run that was made at the relatively higher temperature. Temperatures below about 40° F. are relatively disadvantageous. In all these runs, more than one molecule of isopentane reacted per molecule of olefin to give higher-boiling paraffins; indeed, in the higher-temperature run with isobutylene over five molecules or isopentane reacted per molecule of olefin. Since olefins, because of their relatively greater readiness to react chemically, are in general more valuable than the corresponding paraffins, a major advantage of the disproportionation-alkylation here exemplified is obvious.

*Disproportionation-alkylation of isopentane*

| | Example | | | | | |
|---|---|---|---|---|---|---|
| | V | VI | VII | VIII | IX | X |
| Olefin | $C_3H_6$ | $i-C_4H_8$ | $i-C_4H_8$ | $1-C_4H_8$ | $2-C_4H_8$ | $C_5H_{10}$ |
| Temperature, ° F | 66–79 | 64–86 | 38–61 | 66–100 | 68–102 | 73–100 |
| Reaction time, min | 35.70 | 10–30 | 10–30 | 10–30 | 10–30 | 9–31 |
| Isopentane/olefin (mol.) (feed) | 7.25 | 8.75 | 7.62 | 8.31 | 7.5 | 10.2 |
| Hydrocarbons/HF (vol.) | 7.6 | 1 | 1 | 1 | 1 | 1 |
| Isobutane formed, wt. per cent of olefin | | 261 | 200 | 155 | 187 | 165 |
| Pentane-free liquid product: | | | | | | |
| Yield— | | | | | | |
| Wt. per cent of olefin | 406 | 535 | 443 | 405 | 445 | 437 |
| Wt. per cent of theoretical alkylation yield | 136 | 234 | 194 | 177 | 195 | 216 |
| Composition, vol. per cent— | | | | | | |
| Hexanes | 30.7 | 45.2 | 42.3 | 37.7 | 41.4 | 49.5 |
| Heptanes | 8.8 | 10.2 | 9.0 | 5.1 | 6.7 | 7.5 |
| Octanes | 41.7 | 5.8 | 11.6 | 6.4 | 7.7 | 3.4 |
| Nonanes | 6.3 | 27.3 | 22.6 | 37.0 | 32.2 | 21.9 |
| Decanes | 9.1 | 9.5 | 10.2 | 13.8 | 12.0 | 15.4 |
| Heavier | 3.4 | 2.0 | 4.3 | | | 2.3 |
| Total | 100.0 | 100.0 | 100.0 | 100.0 | 100.0 | 100.0 |
| Aviation-gasoline fraction— | | | | | | |
| Cut point, ° F | 338 | 289 | 289 | 284 | 293 | 295 |
| Yield, vol. per cent | 95.1 | 81.4 | 76.2 | 80.7 | 84.3 | 78.0 |
| Reid vapor pressure, lb | 3.2 | 4.65 | 4.60 | 4.45 | 4.10 | 5.15 |
| Gravity, °API | 71.2 | 75.6 | 75.2 | 74.6 | 73.7 | 76.4 |
| ASTM distillation, ° F.— | | | | | | |
| First drop | 138 | 143 | 143 | 142 | 145 | 140 |
| 10 per cent evap | 173 | 153 | 155 | 155 | 161 | 150 |
| 50 per cent evap | 213 | 175 | 177 | 183 | 191 | 166 |
| 90 per cent evap | 274 | 264 | 273 | 271 | 286 | 284 |
| End point | 344 | 334 | 328 | 321 | 336 | 337 |
| ASTM octane No.— | | | | | | |
| 0 cc. TEL | 75.0 | 75.0 | 76.2 | 74.6 | 79.2 | 72.2 |
| 1 cc. TEL | 86.3 | 88.7 | 90.1 | 87.7 | 89.3 | 86.3 |
| Total products, wt. per cent of olefin | | 796 | 643 | 560 | 632 | 602 |

Another major advantage is provided by the exceedingly high yield of concomitantly formed isobutane, which was of the order of twice the original olefin by weight. This isobutane is of particular value because present sources of this hydrocarbon are inadequate to meet the demand for isobutane as a feed for the manufacture of high-octane aviation gasoline by alkylation. Therefore, this concomitantly formed isobutane may be advantageously separated, preferably as soon as possible after formation, and it may be alkylated with an olefin to aviation-gasoline paraffins in a separate alkylation unit, preferably in the presence of hydrofluoric acid as catalyst. This procedure is relatively more advantageous than recycling the isobutane together with unreacted isopentane back to the first or isopentane-alkylation unit, for the over-all yield of gasoline-range liquid paraffins for the two-stage operation is considerably larger than for the one-stage operation. Furthermore, the liquid product from the alkylation of isobutane is considerably higher in octane rating than the liquid product from the disproportionation alkylation of isopentane with the same olefin; for example, the aviation-gasoline alkylate from hydrofluoric acid alkylation of isobutane with isobutylene has an octane number of about 95-96, which is 20 units higher than the values given in the foregoing tabulation for the aviation-range fraction of the product from the conversion of isopentane. Hence, because of the present demand for high-octane aviation gasoline, the two-stage operation yielding two gasoline range products is relatively more advantageous than the one-stage operation having combined recycling of isobutane and unreacted isopentane. However, this one-stage operation is not outside the broadest scope of this invention.

The isohexanes produced by the disproportionation may be similarly advantageously separated from the product, as by fractional distillation, and may be used as such for blending in motor fuels or may be alkylated with an olefin, as in the presence of hydrofluoric acid, to give paraffins of different volatility.

It should be observed that the reactions promoted in accordance with this invention do not comprise secondary reactions such as for example that of cracking subsequent to ordinary alkylation. In such "cracking-alkylation," the reactant isoparaffin is alkylated with an olefin as in ordinary alkylation and the resulting alkylate is allowed to crack into smaller compounds. Obviously, such cracking-alkylation results in little or no improvement in the over-all yield of paraffins heavier than the original paraffin, whereas by the present invention the over-all yield of such heavier paraffins is markedly increased, and to a surprisingly and quite unexpectedly high degree in the light of past knowledge. Briefly, instead of promoting reactions following alkylation, the present process promotes reactions preceding or accompanying alkylation.

In accordance with this invention, certain desirable reactions are selectively promoted that ordinarily occur to only relatively minor extents in alkylations of paraffins with olefins in the presence of liquid acid-type alkylation catalysts. Because the invention may be practiced otherwise than as specifically described or illustrated, and because many modifications and variations within the spirit and scope of it will be obvious to those skilled in the art of hydrocarbon conversion, the invention should not be unduly restricted by the foregoing specification and examples.

I claim:

1. A process for converting propylene and isobutane into propane and octanes, which comprises admixing propylene at a temperature between about 100 and about 200° F. with a liquid mixture comprising isobutane and hydrogen fluoride, said hydrogen fluoride comprising between about 2 to 6 per cent by weight of said liquid mixture, in an amount such that the mol ratio of hydrogen fluoride to olefin is between about 1.0:1 and 1.2:1, maintaining said admixture for a period between about 5 to 15 minutes, subsequent to said period adding and intimately admixing additional hydrogen fluoride in an amount such that the volume ratio of total liquid hydrogen fluoride to total hydrocarbon is between about 0.3:1 and 2:1 in the resultant mixture, and maintaining the last said liquid admixture at a reaction temperature between about 100 and about 200° F. for a reaction time not greater than about 30 minutes to form propane and octanes.

2. A process for converting propylene and isobutane into propane and octanes, which comprises intimately admixing liquid isobutane and liquid concentrated hydrofluoric acid to form a saturated solution of hydrogen fluoride in said liquid isobutane, separating the major portion of the undissolved hydrofluoric acid from said admixture and leaving a liquid comprising isobutane saturated with hydrogen fluoride and sufficient excess hydrofluoric acid that the total hydrogen fluoride amounts to about 2 to 6 per cent by weight of the total, admixing propylene with said liquid in an amount such that the mol ratio of hydrogen fluoride to olefin is between about 1.0:1 and 1.2:1 and maintaining said admixture at a temperature between about 100 and 200° F. for a period between about 5 to 15 minutes, subsequent to said period adding and intimately admixing additional liquid concentrated hydrofluoric acid in an amount such that the volume ratio of total liquid hydrofluoric acid to hydrocarbon is between about 0.3:1 and 2:1 in the resultant mixture, and maintaining the last said liquid admixture at a reaction temperature between about 100 and about 200° F. for a reaction time not greater than about 30 minutes to form propane and octanes.

3. A process for converting a low-boiling normal olefin and a low-boiling isoparaffin into at least two different paraffins, one corresponding to said normal olefin and one having twice the number of carbon atoms per molecule as said isoparaffin, which comprises intimately admixing a low-boiling normal olefin with a liquid comprising a paraffinic hydrocarbon material, comprising a low-boiling isoparaffin, saturated with hydrogen fluoride and associated with sufficient excess hydrogen fluoride that the total hydrogen fluoride amounts to about 2 to about 6 weight per cent of the total liquid, the mol ratio of hydrogen fluoride to added normal olefin being between about 1.0:1 and 1.2:1, maintaining said admixture at a temperature between about 100 and about 200° F. for a period between about 5 and about 15 minutes, subsequent to said period adding and intimately admixing with the resultant material concentrated liquid hydrofluoric acid in an amount such that the volume ratio of total liquid hydrofluoric acid to total hydrocarbons is between about 0.3:1 and about 2:1 in the resultant mixture, and maintaining the last said liquid admixture at a reaction temperature between about 100 and 200° F. for a reaction time not greater than about 30 minutes to form a paraffin hydrocarbon corresponding to said low-boiling normal olefin and a paraffin hydrocarbon having twice the number of carbon atoms per molecule as said low-boiling isoparaffin.

4. The process of claim 3 in which propylene and isobutane are converted to propane and octanes.

5. The process of claim 3 in which a normal butylene and isobutane are converted to a butane and octanes.

6. The process of claim 3 in which butene-1 and isobutane are converted to a butane and octanes.

7. The process of claim 3 in which a normal butylene and isopentane are converted to a butane and decanes.

MARYAN P. MATUSZAK.